(12) United States Patent
Ziolkowski et al.

(10) Patent No.: US 8,131,522 B2
(45) Date of Patent: Mar. 6, 2012

(54) METHOD FOR ESTIMATING AND REMOVING AIR WAVE RESPONSE IN MARINE ELECTROMAGNETIC SURVEYING

(75) Inventors: Antoni Marjan Ziolkowski, Edinburgh (GB); David Allan Wright, North Berwick (GB)

(73) Assignee: PGS Geophysical AS, Lysaker (NO)

( * ) Notice: Subject to any disclaimer, the term of this patent is extended or adjusted under 35 U.S.C. 154(b) by 280 days.

(21) Appl. No.: 12/459,158

(22) Filed: Jun. 26, 2009

(65) Prior Publication Data
US 2010/0327885 A1 Dec. 30, 2010

(51) Int. Cl.
*G06F 17/50* (2006.01)
*G01V 3/12* (2006.01)

(52) U.S. Cl. ............... 703/2; 703/7; 703/9; 324/334; 324/365; 702/7

(58) Field of Classification Search ............... 703/2, 5–7, 703/9; 324/334, 335, 365; 702/27, 7
See application file for complete search history.

(56) References Cited

U.S. PATENT DOCUMENTS

| | | | |
|---|---|---|---|
| 7,277,806 B2 | 10/2007 | Lu et al. | |
| 7,795,873 B2 * | 9/2010 | Ziolkowski et al. | 324/365 |
| 2007/0061078 A1 | 3/2007 | Lu et al. | |
| 2009/0230970 A1 | 9/2009 | Ziolkowski | |
| 2009/0309599 A1 * | 12/2009 | Ziolkowski | 324/334 |
| 2010/0013486 A1 | 1/2010 | Ziolkowski et al. | |
| 2010/0134110 A1 | 6/2010 | Ziolkowski | |
| 2010/0188090 A1 * | 7/2010 | Ziolkowski | 324/335 |
| 2010/0201367 A1 * | 8/2010 | Ziolkowski | 324/334 |
| 2010/0235100 A1 * | 9/2010 | Hobbs et al. | 702/7 |

FOREIGN PATENT DOCUMENTS

| | | |
|---|---|---|
| GB | 2402745 A | 12/2004 |
| RU | 2007130549 | 2/2009 |
| WO | WO 03/023452 | 3/2003 |
| WO | 2005010560 A1 | 2/2005 |
| WO | WO 2007/094676 | 8/2007 |
| WO | WO 2007/136276 | 11/2007 |
| WO | WO 2008/008124 | 1/2008 |
| WO | 2008023194 A3 | 2/2008 |
| WO | 2008099151 A2 | 8/2008 |

OTHER PUBLICATIONS

Eurasian Search Report, date of mailing, Oct. 21, 2010.
J. H. Coggon and H. F. Morrison, Electromagnetic Investigation of the Sea Floor, Geophysics, Jun. 1970, pp. 476-489, vol. 35, No. 3.
S.E. Johansen, H.E.F. Amundsen, T. Røsten, S. Ellingsrud, T. Eidesmo and A.H. Bhuyian, Subsurface Hydrocarbons Detected by Electromagnetic Sounding, First Break, Mar. 2005, vol. 23.
Xinyou Lu, Dennis Willen, Jason Zhang, and Ida Gallegos, Marine CSEM Data processing Techniques, 2006.
Anton Ziolkowski and David Wright, Removal of the Air Wave in Shallow Marine Transient EM Data, 2007.
European Search Report for Application EP 10 16 7317, dated Oct. 25, 2010.

* cited by examiner

Primary Examiner — Thai Phan

(57) ABSTRACT

A method for determining resistivity distribution of formations below a bottom of a body of water from transient electromagnetic signals acquired by imparting a transient electromagnetic field into the water and detecting an electromagnetic response thereto at a plurality of spaced apart positions from a place of the imparting includes simulating an air wave response at each of the plurality of spaced apart positions. The simulated air wave response is subtracted from the detected response to produce a subsurface impulse response at each of the plurality of positions. The subsurface impulse responses are used to determine the resistivity distribution.

6 Claims, 3 Drawing Sheets

METHOD FOR ESTIMATING AND REMOVING AIR WAVE RESPONSE IN MARINE ELECTROMAGNETIC SURVEYING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine electromagnetic surveying. The present invention relates more specifically to a method for removing an undesirable response called the "airwave" from marine electromagnetic survey data.

2. Background Art

Porous subsurface sedimentary rock formations are typically saturated with fluids as a result of having been deposited in a body of water during sedimentation. As a result, the fluids were initially entirely water. In some subsurface formations the water in the pore spaces has been displaced to some extent after sedimentation by hydrocarbons such as oil and gas. Thus, in some present day subsurface formations, the fluids in their pore spaces may be water, gas or oil, or mixtures of the foregoing.

Detection of formations having less than fully water-saturated pore space, that is, when oil or gas may be present in the pore spaces, is of significant economic interest. Certain techniques for detection of such formations include determining existence of electrical resistivities in the subsurface that are anomalously high. The principle of such detection is based on the fact that the flow of electric current through a porous rock formation is related to the fractional volume of the pore spaces with respect to the total rock volume, the spatial configuration of the pore spaces and the electrical properties of the fluids filling the pore spaces. Brine-saturated porous rock formations, for example, are typically much less resistive than the same rock formations having hydrocarbons in some or all of the pore spaces, because brine is a relatively good electrical conductor while hydrocarbons are typically good electrical insulators.

Various techniques for measuring the electrical resistivity of subsurface rock formations are known in the art, for example, transient controlled source electromagnetic survey techniques such as described in International Patent Application Publication No. WO 03/023452, the contents of which are incorporated herein by reference. Such techniques in general include imparting an electromagnetic field into the subsurface and measuring electric and/or magnetic fields induced in the subsurface in response to the imparted electromagnetic field. For such measurement techniques, the electromagnetic field may be imparted using an electric field transmitter, for example, a device configured to pass an electric current through a dipole electrode. Alternatively a magnetic field transmitter may be used, for example, a device configured to pass an electric current through a wire loop or a plurality of such loops. The receivers used to detect the responsive electromagnetic fields may be, for example, dipole electrodes for measuring potential differences (electric field potential), or may be wire loops, pluralities of wire loops or magnetometers for measuring magnetic field amplitude and/or the time derivatives of magnetic field amplitude.

In transient controlled source electromagnetic surveying, the electric current passed through the transmitter to impart the electromagnetic field may be controlled to provide one or more step changes in the current amplitude. Step change in the transmitter current induces what are referred to as "transient" electromagnetic fields, and the responses measured by the receivers are related to transient response of the formations in the earth's subsurface. Step change in the transmitter current may be obtained by switching the current on, switching the current off, reversing polarity, or combinations of the foregoing. A particularly advantageous form of transmitter current switching configuration used to impart a controlled source electromagnetic field is a so called "pseudo-random binary sequence" (PRBS).

A typical marine electromagnetic survey system includes a controllable current source disposed on a survey vessel or auxiliary vessel. The vessel tows a transmitter cable on or near the water bottom for transmitting an electromagnetic field into the formations below the water bottom by passing transient current between two electrodes disposed on the transmitter. The electromagnetic response of the system including the water and the formations below the water bottom is measured by receivers disposed on a cable on or near the water bottom. The receivers may be pairs of electrodes configured such that each receiver measures the potential difference between its pair of electrodes. All the electrodes are typically in the same vertical plane. In some survey systems, different vessels may be used to tow the transmitter and the receivers to enable the transmitter-receiver separation ("offset") to be more readily adjusted. As described in the WO 03/023452 publication referred to above, the signals in the receivers are measured, as well as the signal transmitted by the transmitter. By deconvolving the measured receiver signal with the measured transmitter signal, the impulse response of the subsurface for the particular transmitter-receiver configuration is obtained.

As a practical matter, the electromagnetic signal generated by the transmitter can follow three general transmission paths to the receiver(s), these paths being through the formations below the water bottom, through the water layer itself and through the air above the water layer. In deep water, for example 2 km or more, and wherein the transmitter and receivers are disposed near the water bottom as is typical in known survey techniques, the part of the signal propagating through the air has a negligible impact on the signals detected by the receiver(s) because the electromagnetic signal from the transmitter is substantially attenuated and delayed in time from the time of the transient current event as it moves to the water surface and returns to the receiver(s) on the water bottom. By contrast, in shallow water, for example 100 m or less, the portion of the signal that moves through the water and air is substantial with respect to the total measured signal. Shallow water electromagnetic surveying has been thought to be impracticable as a result.

There is a need for techniques to determine electromagnetic response of the subsurface formations below the water bottom given the presence of the air wave.

SUMMARY OF THE INVENTION

A method according to one aspect of the invention for determining resistivity distribution of formations below a bottom of a body of water from transient electromagnetic signals acquired by imparting a transient electromagnetic field into the water and detecting an electromagnetic response thereto at a plurality of spaced apart positions from a place of the imparting includes simulating an air wave response at each of the plurality of spaced apart positions. The simulated air wave response is subtracted from the detected response to produce a subsurface impulse response at each of the plurality of positions. The subsurface impulse responses are used to determine the resistivity distribution.

A method according to another aspect of the invention for determining resistivity distribution below a body of water from transient electromagnetic signals acquired by imparting a transient electromagnetic field into the water and detecting a response thereto at a plurality of spaced apart positions includes generating an initial model of resistivity distribution in the water and formations. A first part of an air wave corresponding to the place of imparting and each spaced apart position is calculated. A resistivity distribution of a water part of the initial model is adjusted and the calculating response of the first part is repeated until differences between a measured first part and the calculated first part are minimized. A second part of the air wave is calculated for each of the spaced apart locations and is combined with the first part to generate a complete air wave. The air wave is subtracted from the measured response at each location to determine an impulse response. A resistivity distribution is generated from the impulse responses.

Other aspects and advantages of the invention will be apparent from the following description and the appended claims.

DETAILED DESCRIPTION

As explained in the Background section herein, in transient electromagnetic surveying, a transient electromagnetic field, resulting from one or more step changes in current imparted to a transmitter, is imparted into the subsurface and a response to the imparted transient electromagnetic field is measured, typically at a plurality of positions spaced apart from the position at which the electromagnetic field is imparted. The measurement can be of induced voltage, magnetic field or combinations thereof. A "total impulse response" of all the Earth structure below the transmitter and receivers can be obtained by deconvolving the measured transient response with a measurement of the transmitter current. Various examples of transient current event that may produce the necessary electromagnetic field as it concerns the present invention may include, without limitation, switching direct current (DC) on, switching DC off, reversing DC polarity or encoding DC in a sequence of switching events such as a pseudorandom binary sequence ("PRBS").

Figure 1:
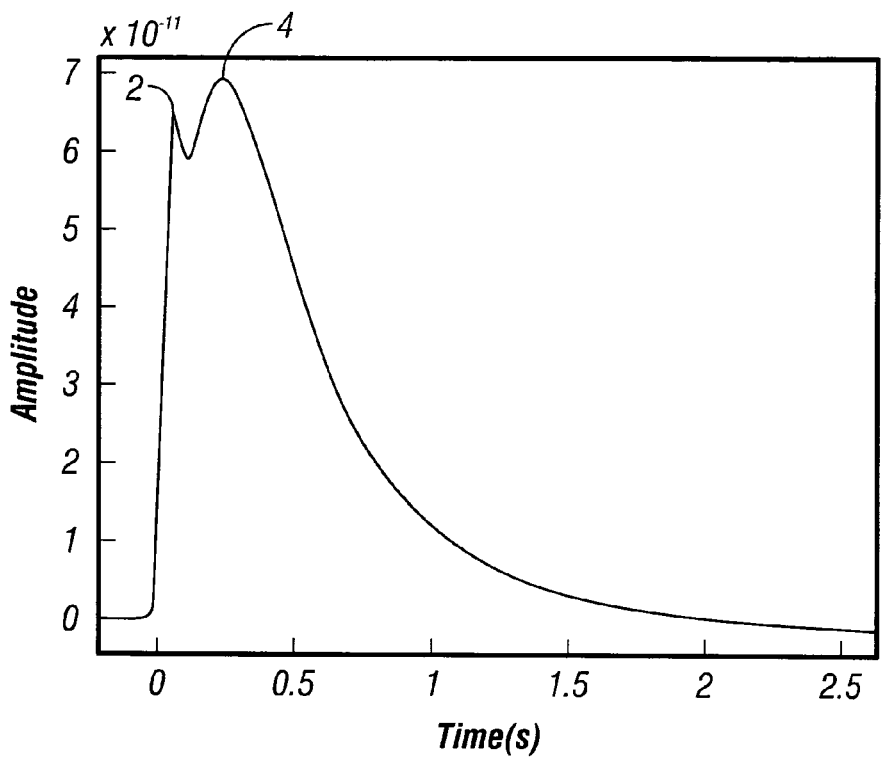
FIG. 1 shows an example transient impulse response in a marine environment.

FIG. 1 shows an example of an actual marine total impulse response from measurements made in the North Sea in water depth of about 100 meters and transmitter-receiver separation of about 2 kilometers. An initial amplitude peak, shown at 2, occurring just after the current switching event is identifiable as the "air wave" and it is this response that is intended to be addressed by the present invention. A second, slightly larger peak, shown at 4, and occurring at about 0.25 seconds after the current switching event is the subsurface response to the imparted transient electromagnetic field. The total impulse response actually measured is the superposition of the air wave and the subsurface response.

Figure 2:
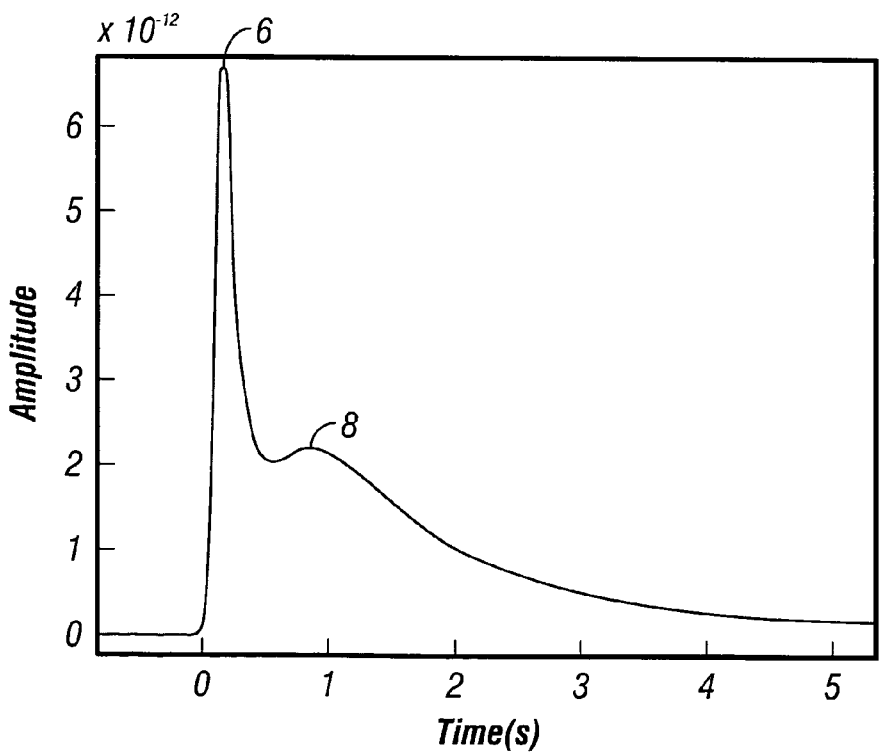
FIG. 2 shows another example transient impulse response in a marine environment.

FIG. 2 shows another example of a measured total impulse response from the North Sea, with water depth of about 100 meters and a source-receiver separation of about 4 kilometers. The initial peak, shown at 6, at about 0.1 seconds from the transient current event is the air wave. A second, smaller peak, shown at 8, and occurring at about 0.9 seconds after the transient current event is from the subsurface impulse response.

Figure 3:
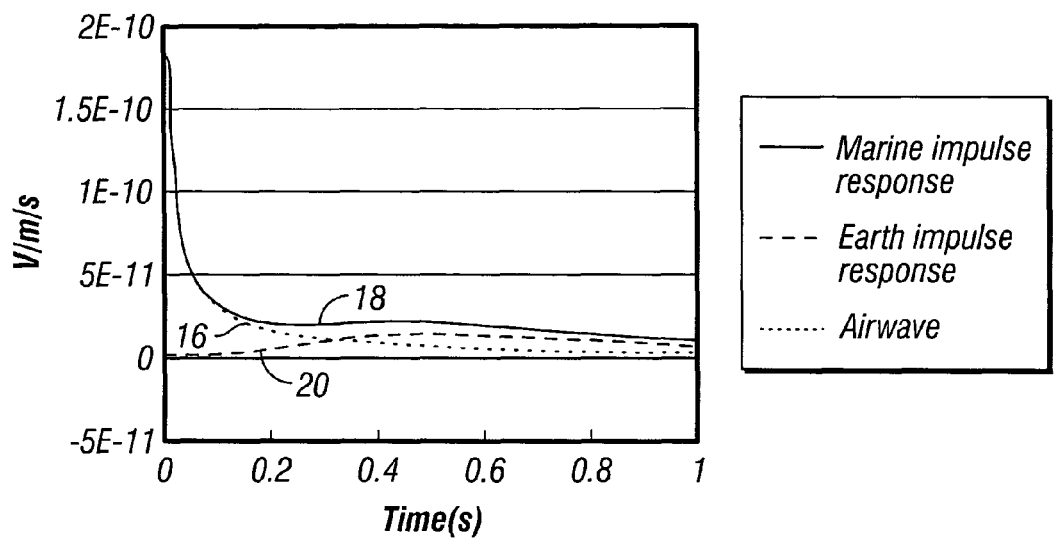
FIG. 3 shows an example decomposition of a marine transient impulse response.

As explained in the Background section herein, when electromagnetic signals are acquired in a body of water to survey formations below the bottom of the water, a particular consideration in designing the survey is the water depth. For marine electromagnetic survey techniques known in the art in which the transmitters and the receivers are typically disposed near the bottom of the body of water, it is expected that the air wave will have a material effect on the receiver measurements if the water depth is insufficient. FIG. 3 shows a synthetic transient electromagnetic response computed for a shallow water marine environment, consisting of a water layer and formations below the water layer. The response is shown in the graph of FIG. 3 as the time derivative of measured voltage after a step change in current from a 1 Ampere-meter dipole moment transmitter. In the simulation shown in FIG. 3, the simulated water layer is 100 meters deep and has an electrical conductivity of 3.3 S/m. The simulated transmitter to receiver offset is 2 kilometers and the simulated formations in the subsurface are represented by a 1 ohm-m resistivity (1 S/m conductivity) half space. The total response shown at 18 includes the response caused by the air wave, which response is decomposed into a separate curve shown at 16, and the response of the subsurface formations which is decomposed into a separate curve shown at 20. It can be observed that the air wave 16 begins with a high amplitude, short duration peak and then decays with respect to time. The air wave 16 still has substantial amplitude when the subsurface response 20 begins, however. Because of the foregoing, the air wave 16 can substantially affect the apparent response of the formations below the water layer (30 in FIG. 4). The air wave 16 thus contaminates the portion of the transmitted electromagnetic signal that has traveled through the formations prior to detection, which portion contains information about the subsurface electrical resistivity that is of interest.

Figure 4:
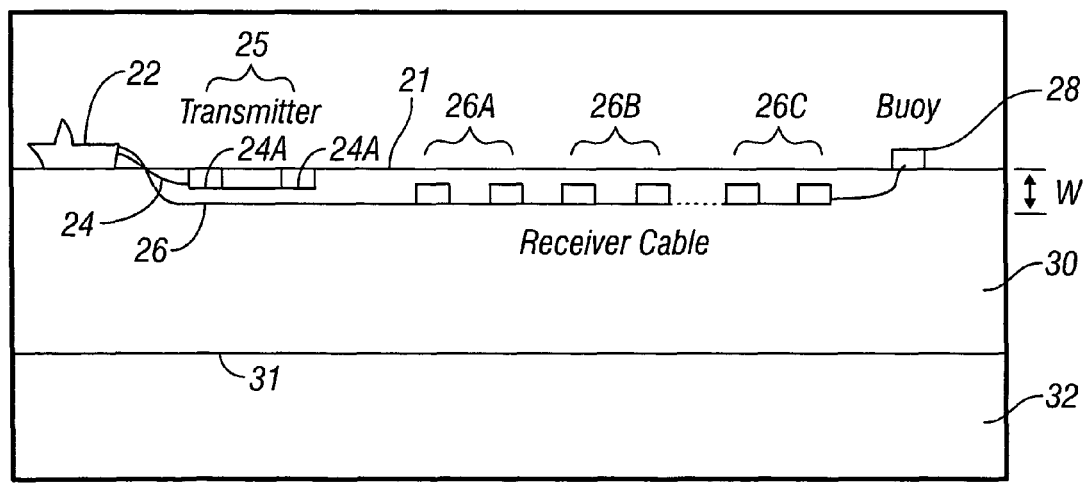
FIG. 4 shows an example of marine acquisition using a method according to the invention.

FIG. 4 shows an example marine electromagnetic survey system as it may be used in accordance with the invention. The system may include one or more survey vessels, one such vessel shown at 22, moving along the surface 21 of a body of water 30 such as a lake or the ocean. The vessel 22 can tow an electromagnetic transmitter cable 24 in the body of water 30. The same vessel 22 or a different vessel (not shown) may tow an electromagnetic receiver cable 26 in the water 30. The vessel 22 may include equipment (not shown separately) of types known in the art for actuating the transmitter cable 24 and detecting and recording signals from one or more receivers 26A on the receiver cable 26. The receiver cable 26 may be terminated with a tail buoy 28 having various navigation and signal processing devices thereon (not shown separately).

The transmitter on the transmitter cable 24 may be a pair of electrodes 24A. One or more of the receivers on the receiver cable 26 may be a pair of electrodes, shown at 26A, 26B, 26C for each such pair. The use of electrode pairs to measure electric field response is not a limit on the scope of the invention. Other systems may use, alternatively or additionally, various magnetic field sensing devices such as wire coils or loops or magnetometers to measure magnetic field response to the imparted transient electromagnetic field.

Because water, particularly seawater, is a conductor of electricity, contact of the water with the electrodes 24A and 26A, 26B, 26C provides electrical coupling therefrom to the formations 32 below the water bottom 31. The transmitter signal may be merely by a step change in current applied across the transmitter electrodes 24A, but may also be any transient-switched signal, including, for example, a pseudorandom binary sequence. The receivers (electrode pairs 26A, 26B, 26C) may measure potential difference, or, for example, the rate of change of the magnetic field stimulated by the transmitter signal. The recorded responses from the receivers (electrode pairs 26A, 26B, 26C) may be downloaded to the hard disk or other storage medium of a general purpose, programmable computer.

The principle of a method according to the invention is to obtain the characteristics of the entire air wave present in the response measured by each receiver by modeling and inversion. Once the characteristics of the air wave are determined for each receiver measurement, the air wave response may be subtracted from the measurement, leaving as a remainder only the impulse response of the subsurface.

The impulse response of the water layer and the subsurface at any receiver may be calculated for a three dimensional model of the water layer and the subsurface formations below the water bottom. The model may include the transmitter-receiver geometry, the water bottom topography, the water layer resistivity $\rho_w$, (which may be uniform or vary with depth) and a subsurface (below the water bottom) resistivity model. The latter model may be known approximately from any other available subsurface petrophysical or geophysical data, for example, nearby well logs.

An important observation with respect to FIGS. 2 and 3 is that most of the air wave response occurs generally before the Earth's subsurface impulse response is substantial. That is, the air wave response depends mostly on the parameters of the water layer and is substantially independent of the electrical conductivity and its spatial distribution below the water bottom (31 in FIG. 4). From electromagnetic modeling, it has been determined that the air wave is much more sensitive to the depth (W in FIG. 4) of the transmitter and receivers below the water surface (21 in FIG. 4) than it is to the topography (shape) of the water bottom.

A "first part" of the air wave may be defined as the part for which the subsurface response is negligible. The first part of the method is to model the first part of the air wave, an example of which occurs from 0 to about 0.1 seconds in FIG. 3. The first part of the air wave is most sensitive to the water layer parameters, e.g., depth of the transmitter and receivers, depth of the water layer and resistivity, most of which are known or can be determined. The principal parameter for this part of the method, however, is determination of the resistivity of the water layer. The resistivity may be uniform throughout the water layer, or the resistivity may vary with respect to depth, for example, as a layered sequence or as a surface resistivity value and a depth-based gradient. The resistivity parameters of the water layer model are adjusted such that the difference between the first part of air wave in the measured response from each receiver and the corresponding modeled air wave for each receiver is minimized. Because the first part of the air wave in particular is not very sensitive to the parameters of the subsurface formations, they do not need to be known with great precision in modeling the first part of the air wave.

It is expected that the water resistivity model found by the foregoing inversion process should be close to those found from measurements. Measured values, if available, should be used for the initial model. Approximate values for an initial model can be found from standard tables, given the sea water temperature and salinity. The result of the inversion process is considered to be substantially correct if the calculated air wave first part substantially matches the first part of the measured air wave for a plurality of receivers.

Figure 5:
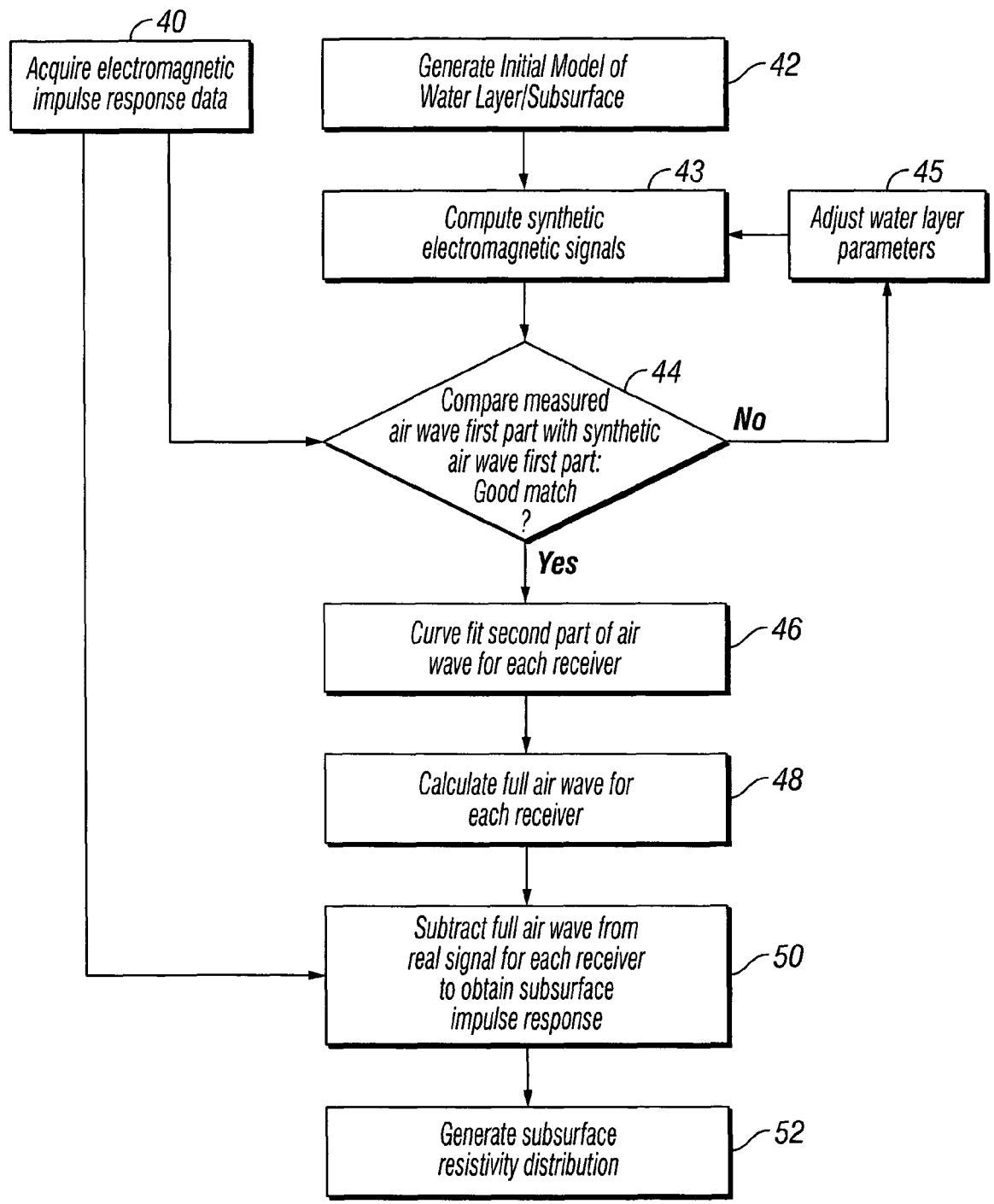
FIG. 5 shows a flow chart of an example process according to the invention.

Having thus obtained the first part of the air wave, it is then necessary to determine the remaining part of the air wave. In one example, if the water layer is of substantially uniform depth, the air wave may be calculated for a transmitter-receiver separation r, much greater than the largest actual transmitter to receiver distance for the example system shown in FIG. 4. Such calculated air wave may be assumed to have substantially no subsurface impulse response. An alternative is to fit a curve to the "tail" of the air wave waveform. It has been determined that the late time part of the air wave may be fitted with a curve of the form:

$$G(t) = A\exp\left(\frac{B}{t}\right)t^C \quad (1)$$

in which the G(t) represents signal amplitude with respect to time, and coefficients A, B, and C are different for each transmitter-receiver pair. Often there are not enough data in the measured receiver responses to enable the coefficients A, B and C to be calculated accurately. However, the modeled data may be calculated at any desired sample rate, so the coefficients A, B and C can be found by fitting the result of equation (1) to the modeled data. The process consists of the following, explained with reference to FIG. 5.

Transient marine electromagnetic survey data are collected, at 40, and processed to obtain impulse responses for each transmitter-receiver pair. The latter processing may include, for example, deconvolution of the receiver signal with a transmitter current signal if a coded transmitter sequence such as a PRBS is used. An initial resistivity model of the water-subsurface system is created at 42. Such model will include the water layer and subsurface parameters, including resistivity as explained above. Synthetic impulse responses based on the initial model are generated at 43 for each transmitter-receiver pair, or, based on the transmitter position, for each receiver; these should preferably include the positions of the individual transmitters and receivers for each measurement made. At 44, the first part of the synthetic impulse response is compared with the first part of the measured impulse response for all receivers. If the match is inadequate, as a non-limiting example, a root mean square error of at most about one percent, the water layer resistivity parameters in the model are adjusted at 45, and the synthetic responses are recalculated at 43 until differences between the measured responses and the synthetic responses in the first part of the air wave response are minimized for all receiver signals. At 46, the second part or "tail" of the air wave is estimated for each transmitter-receiver pair by fitting an appropriate curve to the decaying part of the modeled air wave, for example equation (1). The complete air wave for each receiver signal is then obtained, at 48, by combining the first part obtained at 44 as explained above with the tail obtained at 46 by curve-fitting explained above. At 50, the complete air wave for each receiver is then subtracted from the total measured impulse response for each receiver. The remainder, which is the subsurface impulse response measured at each receiver, may be used, at 52 in any form of inversion process to generate a model or image of spatial distribution of electrical conductivity in the subsurface below the water bottom.

Methods according to the invention may provide the capability to give accurate electromagnetic survey results even in relatively shallow water as contrasted with methods known in the art prior to the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining resistivity distribution of formations below a bottom of a body of water, the method comprising:
    simulating an air wave response at each of a plurality of spaced apart positions in the body of water from a place of imparting a transient electromagnetic field into the water;
    imparting a transient electromagnetic field into the water at the place;
    detecting an electromagnetic response to the imparted transient electromagnetic field at the plurality of spaced apart positions;
    subtracting the simulated air wave response from the detected response to produce a subsurface impulse response at each of the plurality of positions; and
    using the subsurface impulse responses to determine the resistivity distribution, wherein the simulating the air wave response comprises:
        generating an initial model of resistivity distribution in the water and in the formations;
        calculating a response of a first part of the air wave corresponding to each spaced apart position;
        adjusting a resistivity distribution of a water part of the initial model and repeating the calculating response of the first part until differences between a measured first part and the calculated first part are minimized for each of the spaced apart positions; and
        calculating a second part of the air wave for each of the spaced apart positions and combining the second part with the result of the adjusting and repeated calculating the first part to generate a complete air wave for each of the spaced apart positions.

2. The method of claim 1 wherein the calculating the second part comprises curve fitting.

3. The method of claim 2 wherein the fitted curve is in the form of $$G(t) = A\exp\left(\frac{B}{t}\right)t^C$$

in which G(t) represents signal amplitude with respect to time and A, B and C are constants determined by empirically matching the fit curve to the measured response at each spaced apart position.

4. A method for determining resistivity distribution of formations below a bottom of a body of water, comprising:
    imparting a transient electromagnetic field into the water;
    detecting an electromagnetic response to the imparted field at a plurality of spaced apart positions from a place of the imparting;
    simulating an air wave response at each of the plurality of spaced apart positions;
    subtracting the simulated air wave response from the detected response to produce a subsurface impulse response at each of the plurality of positions; and
    using the subsurface impulse responses to determine the resistivity distribution, wherein the simulating the air wave response comprises:
        generating an initial model of resistivity distribution in the water and in the formations;
        calculating a response of a first part of the air wave corresponding to each spaced apart position;
        adjusting a resistivity distribution of a water part of the initial model and repeating the calculating response or the first part until differences between a measured first part and the calculated first part are minimized for each of the spaced apart positions; and
        calculating a second part of the air wave for each of the spaced apart positions and combining the second part with the result of the adjusting and repeated calculating the first pan to generate a complete air wave for each of the spaced apart positions.

5. The method of claim 4 wherein the calculating the second part comprises curve fitting.

6. The method of claim 5 wherein the fitted curve is in the form of $$G(t) = A\exp\left(\frac{B}{t}\right)t^C$$

in which G(t) represents signal amplitude with respect to time and A, B and C are constants determined by empirically matching the lit curve to the measured response at each spaced apart position.

* * * * *

UNITED STATES PATENT AND TRADEMARK OFFICE
CERTIFICATE OF CORRECTION

PATENT NO. : 8,131,522 B2
APPLICATION NO. : 12/459158
DATED : March 6, 2012
INVENTOR(S) : Antoni Marjan Ziolkowski and David Allan Wright Page 1 of 1

It is certified that error appears in the above-identified patent and that said Letters Patent is hereby corrected as shown below:

In the Claims:

Claim 4, column 8, line 38: replace "pan" with "part"

Claim 6, column 8, line 51: replace "lit" with "fit"

Signed and Sealed this
Fourth Day of June, 2013

Teresa Stanek Rea
*Acting Director of the United States Patent and Trademark Office*